United States Patent
Macready

(10) Patent No.: US 8,977,576 B2
(45) Date of Patent: Mar. 10, 2015

(54) METHODS FOR SOLVING COMPUTATIONAL PROBLEMS USING A QUANTUM PROCESSOR

(75) Inventor: William G. Macready, West Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 552 days.

(21) Appl. No.: 13/300,169

(22) Filed: Nov. 18, 2011

(65) Prior Publication Data

US 2014/0025606 A1 Jan. 23, 2014

Related U.S. Application Data

(60) Provisional application No. 61/415,568, filed on Nov. 19, 2010.

(51) Int. Cl.
*G06N 99/00* (2010.01)

(52) U.S. Cl.
CPC .................................. *G06N 99/002* (2013.01)
USPC .......................................................... 706/12

(58) Field of Classification Search
CPC .................................................. G06N 99/005
USPC ........................................... 706/12; 708/231
See application file for complete search history.

(56) References Cited

U.S. PATENT DOCUMENTS

| | | |
|---|---|---|
| 7,135,701 B2 | 11/2006 | Amin et al. .................... 257/31 |
| 7,418,283 B2 | 8/2008 | Amin ........................... 505/170 |
| 7,533,068 B2 | 5/2009 | Maassen van den Brink et al. .............................. 706/10 |
| 7,876,248 B2 | 1/2011 | Berkley et al. ................ 341/133 |
| 8,008,942 B2 | 8/2011 | Van Den Brink et al. ........ 326/4 |
| 8,035,540 B2 | 10/2011 | Berkley et al. ................ 341/133 |

(Continued)

FOREIGN PATENT DOCUMENTS

| | | |
|---|---|---|
| JP | 2008-153928 A | 7/2008 |
| JP | 2006-153461 A | 7/2014 |
| WO | 2009/120638 | 10/2009 |
| WO | 2011/153521 A2 | 12/2011 |

OTHER PUBLICATIONS

Amin, "Effect of Local Minima on Adiabatic Quantum Optimization," Physical Review Letters PRL 100(130503):1-4, 2008.

(Continued)

*Primary Examiner* — Jeffrey A Gaffin
*Assistant Examiner* — Ola Olude Afolabi
(74) *Attorney, Agent, or Firm* — Seed IP Law Group PLLC

(57) ABSTRACT

Methods for solving a computational problem including minimizing an objective including a set of weights and a dictionary by casting the weights as Boolean variables and alternately using a quantum processor and a non-quantum processor to successively optimize the weights and the dictionary, respectively. A first set of values for the dictionary is guessed and the objective is mapped to a QUBO. A quantum processor is used to optimize the objective for the Boolean weights based on the first set of values for the dictionary by minimizing the resulting QUBO. A non-quantum processor is used to optimize the objective for the dictionary based on the Boolean weights by updating at least some of the columns of the dictionary. These processes are successively repeated until a solution criterion is met. Minimization of the objective may be used to generate features in a learning problem and/or in data compression.

20 Claims, 4 Drawing Sheets

(56) References Cited

U.S. PATENT DOCUMENTS

| | | | |
|---|---|---|---|
| 2008/0176750 A1 | 7/2008 | Rose et al. | 505/170 |
| 2008/0215850 A1 | 9/2008 | Berkley et al. | 712/1 |
| 2009/0103795 A1 | 4/2009 | Mazaika et al. | |
| 2009/0121215 A1 | 5/2009 | Choi | 257/31 |
| 2011/0022820 A1 | 1/2011 | Bunyk et al. | 712/1 |
| 2011/0210738 A1 | 9/2011 | Penanen et al. | |
| 2011/0231462 A1* | 9/2011 | Macready et al. | 708/231 |

OTHER PUBLICATIONS

Lovasz et al., "A correction: orthogonal representations and connectivity of graphs," Linear Algebra and its Applications 313:101-105, 2000.

Macready et al., "Applications of Hardware Boltzmann Fits," U.S. Appl. No. 61/505,044, filed Jul. 6, 2011, 8 pages.

Macready et al., "Applications of Hardware Boltzmann Fits," U.S. Appl. No. 61/515,742, filed Aug. 5, 2011, 11 pages.

Macready et al., "Applications of Hardware Boltzmann Fits," U.S. Appl. No. 61/540,208, filed Sep. 28, 2011, 12 pages.

Macready et al., "Systems and Methods for Minimizing an Objective Function," U.S. Appl. No. 61/550,275, filed Oct. 21, 2011, 26 pages.

Macready et al., "Systems and Methods for Minimizing an Objective Function," U.S. Appl. No. 61/557,783, filed Nov. 9, 2011, 45 pages.

International Search Report, mailed Jan. 14, 2014, for PCT/US2013/061459, 3 pages.

Written Opinion, mailed Jan. 14, 2014, for PCT/US2013/061459, 4 pages.

* cited by examiner

METHODS FOR SOLVING COMPUTATIONAL PROBLEMS USING A QUANTUM PROCESSOR

CROSS REFERENCE TO RELATED APPLICATION

This application claims benefit under 35 U.S.C. 119(e) of U.S. Provisional Patent Application Ser. No. 61/415,568, filed Nov. 19, 2010, and entitled "Methods for Solving Computational Problems Using a Quantum Processor," which is incorporated herein by reference in its entirety.

BACKGROUND

Field

The present methods generally relate to solving computational problems using a quantum processor via a compressed sensing technique.

Superconducting Qubits

There are many different hardware and software approaches under consideration for use in quantum computers. One hardware approach employs integrated circuits formed of superconducting material, such as aluminum and/or niobium, to define superconducting qubits. Superconducting qubits can be separated into several categories depending on the physical property used to encode information. For example, they may be separated into charge, flux and phase devices. Charge devices store and manipulate information in the charge states of the device; flux devices store and manipulate information in a variable related to the magnetic flux through some part of the device; and phase devices store and manipulate information in a variable related to the difference in superconducting phase between two regions of the phase device.

Many different forms of superconducting flux qubits have been implemented in the art, but all successful implementations generally include a superconducting loop (i.e., a "qubit loop") that is interrupted by at least one Josephson junction. Some embodiments implement multiple Josephson junctions connected either in series or in parallel (i.e., a compound Josephson junction) and some embodiments implement multiple superconducting loops.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further detail and embodiments of exemplary quantum processors that may be used in conjunction with the present methods are described in U.S. Pat. Nos. 7,533,068, 8,008,942, US Patent Publication 2008-0176750, US Patent Publication 2009-0121215, and PCT Patent Publication 2009-120638 (now US Patent Publication 2011-0022820).

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the s coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present methods, an "adiabatic" evolution is considered to be an evolution that satisfies the adiabatic condition:

$$\dot{s} |\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. Nos. 7,135,701 and 7,418,283.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian and therefore quantum annealing may be used to find the solution to such a hard problem. Adiabatic quantum computation is a special case of quantum annealing for which the system, ideally, begins and remains in its ground state throughout an adiabatic evolution. Thus, those of skill in the art will appreciate that quantum annealing methods may generally be implemented on an adiabatic quantum computer, and vice versa. Throughout this specification and the appended claims, any reference to quantum annealing is intended to encompass adiabatic quantum computation unless the context requires otherwise.

Quantum annealing is an algorithm that uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D;$$

where Γ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing Γ). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in a local minimum close to the exact solution The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quadratic Unconstrained Binary Optimization Problems

A quadratic unconstrained binary optimization ("QUBO") problem is a form of discrete optimization problem that involves finding a set of N binary variables $\{x_i\}$ that minimizes an objective function of the form:

$$E(x_1, \ldots, x_N) = \sum_{i \leq j}^{N} Q_{ij} x_i x_j$$

where Q is typically a real-valued upper triangular matrix that is characteristic of the particular problem instance being studied. QUBO problems are known in the art and applications arise in many different fields, for example machine learning, pattern matching, economics and finance, and statistical mechanics, to name a few.

BRIEF SUMMARY

A method of minimizing an objective including a set of weights and a dictionary may be summarized as including casting the set of weights in the objective as Boolean variables using a digital processor; setting a first set of values for the dictionary using the digital processor; optimizing the objective for a first set of values for the Boolean weights based on the first set of values for the dictionary, wherein optimizing the objective for a first set of values for the Boolean weights includes mapping the objective to a first quadratic unconstrained binary optimization ("QUBO") problem and using a quantum processor to at least approximately minimize the first QUBO problem; optimizing the objective for a second set of values for the dictionary based on the first set of values for the Boolean weights, wherein optimizing the objective for a second set of values for the dictionary includes using a non-quantum processor to update at least some of the values for the dictionary; optimizing the objective for a second set of values for the Boolean weights based on the second set of values for the dictionary, wherein optimizing the objective for a second set of values for the Boolean weights includes mapping the objective to a second QUBO problem and using the quantum processor to at least approximately minimize the second QUBO problem; and optimizing the objective for a third set of values for the dictionary based on the second set of values for the Boolean weights, wherein optimizing the objective for a third set of values for the dictionary includes using the non-quantum processor to update at least some of the values for the dictionary. The method may include optimizing the objective for a $t^{th}$ set of values for the Boolean weights, where t is an integer greater than 2, based on the third set of values for the dictionary, wherein optimizing the objective for a $t^{th}$ set of values for the Boolean weights may include mapping the objective to a $t^{th}$ QUBO problem and using the quantum processor to at least approximately minimize the $t^{th}$ QUBO problem; optimizing the objective for a $(t+1)^{th}$ set of values for the dictionary based on the $t^{th}$ set of values for the Boolean weights, wherein optimizing the objective for a $(t+1)^{th}$ set of values for the dictionary may include using the non-quantum processor to update at least some of the values for the dictionary; and optimizing the objective for a $(t+1)^{th}$ set of values for the Boolean weights based on the $(t+1)^{th}$ set of values for the dictionary, wherein optimizing the objective for a $(t+1)^{th}$ set of values for the Boolean weights may include mapping the objective to a $(t+1)^{th}$ QUBO problem and using the quantum processor to at least approximately minimize the $(t+1)^{th}$ QUBO problem. Optimizing the objective for a $(t+1)^{th}$ set of values for the dictionary based on the $t^{th}$ set of values for the Boolean weights and/or optimizing the objective for a $(t+1)^{th}$ set of values for the Boolean weights based on the $(t+1)^{th}$ set of values for the dictionary may each be repeated for incremental values of t until at least one solution criterion is met. The at least one solution criterion may include, for example, either convergence of the set of values for the Boolean weights or convergence of the set of values for the dictionary. Minimizing an objective may include, for example, generating features in a learning problem, such as a learning problem selected from the group consisting of: pattern recognition, training an artificial neural network, and software verification and validation. The learning problem may correspond to either a machine learning problem or an application of artificial intelligence.

The set of values for the dictionary may include, for example, a set of columns, and updating at least some of the values for the dictionary may include updating at least some of the columns of the dictionary. Using a quantum processor to at least approximately minimize the first QUBO problem may include, for example, using the quantum processor to perform at least one of adiabatic quantum computation or quantum annealing. Minimizing an objective may include solving a sparse least squares problem and/or performing data compression.

A method of minimizing an objective including a set of weights and a dictionary may be summarized as including casting the set of weights in the objective as Boolean variables using a digital processor; setting a first set of values for the Boolean weights using the digital processor; optimizing the objective for a first set of values for the dictionary based on the first set of values for the Boolean weights, wherein optimizing the objective for a first set of values for the dictionary includes using a non-quantum processor to update at least some of the values for the dictionary; optimizing the objective for a second set of values for the Boolean weights based on the first set of values for the dictionary, wherein optimizing the objective for a second set of values for the Boolean weights includes mapping the objective to a first quadratic unconstrained binary optimization ("QUBO") problem and using a quantum processor to at least approximately minimize the first QUBO problem; optimizing the objective for a second set of values for the dictionary based on the second set of values for the Boolean weights, wherein optimizing the objective for a second set of values for the dictionary includes using the non-quantum processor to update at least some of the values for the dictionary; and optimizing the objective for a third set of values for the Boolean weights based on the second set of values for the dictionary, wherein optimizing the objective for a third set of values for the Boolean weights includes mapping the objective to a second quadratic unconstrained binary optimization ("QUBO") problem and using a quantum processor to at least approximately minimize the second QUBO problem.

The method may further include optimizing the objective for a $t^{th}$ set of values for the dictionary, where t is an integer greater than 2, based on the third set of values for the Boolean weights, wherein optimizing the objective for a $t^{th}$ set of values for the dictionary may include using the non-quantum processor to update at least some of the values for the dictionary; optimizing the objective for a $(t+1)^{th}$ set of values for the Boolean weights based on the $t^{th}$ set of values for the dictionary, wherein optimizing the objective for a $(t+1)^{th}$ set of values for the Boolean weights may include mapping the objective to a $t^{th}$ quadratic unconstrained binary optimization ("QUBO") problem and using a quantum processor to at least approximately minimize the $t^{th}$ QUBO problem; and optimizing the objective for a $(t+1)^{th}$ set of values for the dictionary based on the $(t+1)^{th}$ set of values for the Boolean weights, wherein optimizing the objective for a $(t+1)^{th}$ set of values for the dictionary may include using the non-quantum processor to update at least some of the values for the dictionary. Optimizing the objective for a $(t+1)^{th}$ set of values for the Boolean weights based on the $t^{th}$ set of values for the dictionary and/or optimizing the objective for a $(t+1)^{th}$ set of values for the dictionary based on the $(t+1)^{th}$ set of values for the Boolean weights may each be repeated for incremental values of t until at least one solution criterion is met. The at least one solution criterion may include, for example, either convergence of the set of values for the Boolean weights or convergence of the set of values for the dictionary, and the method may further include determining whether convergence has occurred.

The systems may take the form of data compression systems used to compress data. The methods may take the form of methods of operating a data compression system to compress data.

The systems may take the form of learning problem systems used to configure a machine or implement artificial intelligence. The methods may take the form of methods of operating a learning problem system.

The systems may take the form of pattern matching systems used to match patterns in data, for instance image data. The methods may take the form of methods of operating a pattern matching system to match patterns in data, for instance image data.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
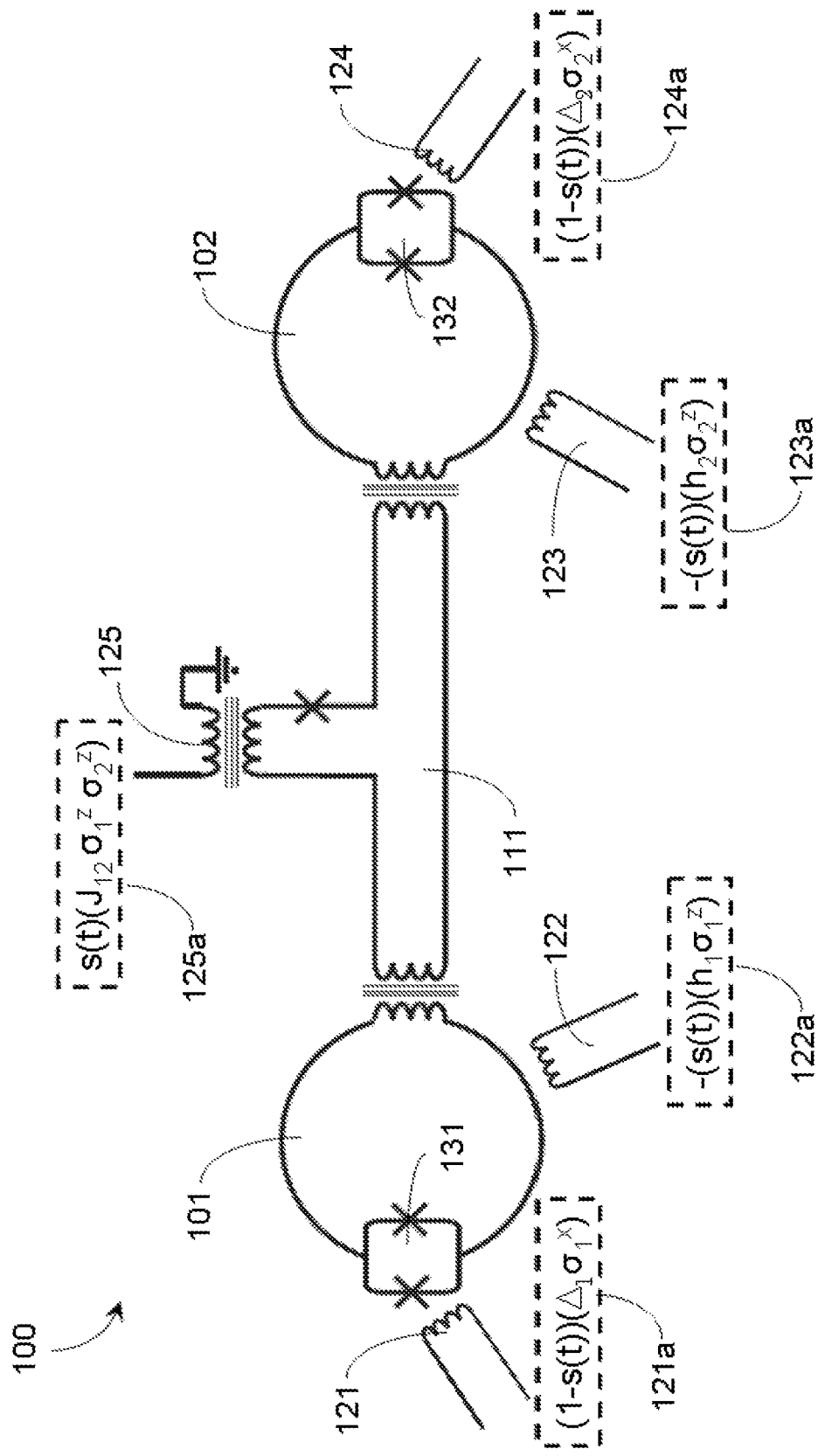
FIG. 1 is a schematic diagram of a portion of a superconducting quantum processor designed for adiabatic quantum computation and/or quantum annealing to implement the present methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide methods of using a quantum processor to solve a computational problem by employing techniques of compressed sensing. For example, an objective that is normally minimized in compressed sensing techniques is re-cast as a quadratic unconstrained binary optimization ("QUBO") problem that is well-suited to be solved using a quantum processor, such as an adiabatic quantum processor and/or a processor designed to implement quantum annealing.

An objective that is typically minimized in compressed sensing techniques is known as the "sparse least squares problem":

$$\sum_{i=1}^{S} \{\|y_i - Dw_i\|_2^2 + \lambda \|w_i\|_1\}. \tag{1}$$

The sparse least squares problem seeks a basis for a collection of N-dimensional real-valued signals $\{y_i | 1 \le i \le S\}$ in which any given $y_i$ is expressible as a linear combination of few basis vectors. This problem finds application in, for example, data compression, feature extraction in machine learning, dimensionality reduction for visualization, semantic hashing for fast information retrieval, and many other domains.

The matrix D has dimensions of N×K where each column represents a basis vector. The K basis elements are sometimes called "atoms" and may be overcomplete. Each weight $w_i$ is K×1. The matrix D is referred to as a "dictionary" and the goal of the sparse least squares problem is to minimize the objective of equation 1 with respect to both $w_i$ and the basis vectors of the dictionary D. The minimization is usually done in steps using block coordinate descent as the objective is convex in w and D individually, but not jointly. In accordance with the present methods, at least part of the minimization may be mapped to a QUBO problem by restricting the weights $w_i$ to Boolean values of, for example, 0 or 1. An example of the objective then becomes:

$$\sum_{i=1}^{S} \{\|y_i - Dw_i\|_2^2 + \lambda \langle 1, w_i \rangle\} \tag{2}$$

The objective of equation 2 is to be minimized with respect to each Boolean-valued vector $w_i$ and the real-valued basis elements stored in D. In some instances, casting the weights $w_i$ as Boolean values realizes a kind of 0-norm sparsity penalty. For many problems, the 0-norm version of the problem is expected to be sparser than the 1-norm variant. Historically, the 0-norm variation has been less studied as it can be more difficult to solve.

As previously described, a QUBO problem may typically be written in the form:

$$E(x_1, \ldots, x_N) = \sum_{i \le j}^{N} Q_{ij} x_i x_j, \tag{3}$$

where the objective is to, for example, minimize E. In accordance with the present methods, the Boolean version of the sparse least squares problem given in equation 2 may be mapped to the QUBO problem given in equation 3 such that the Q term of the QUBO problem is given by $D^T D$. More specifically, the $Q_{ij}$ elements of equation 3 (with $i \ne j$) may be given by $(D^T D)_{ij} = d_i^T d_j$.

The Boolean objective given by equation 2 may be optimized by, for example, guessing initial values for the basis elements of the dictionary D, optimizing for the values of the Boolean weights $w_i$ that correspond to the initial guessed elements of D, then optimizing for the elements of D that correspond to the first optimized values of $w_i$, then re-optimizing for the values of the Boolean weights $w_i$ that correspond to the first optimized dictionary D, and continuing this back-and-forth optimization procedure until some solution criteria are met or until the optimization converges. The optimization procedure may begin, for example, by using guessed values for the Boolean weights $w_i$ and first optimizing for the dictionary D rather than first guessing values for the elements of D and optimizing for the Boolean weights $w_i$.

In some instances, the dictionary D may be continuous. In such instances, it may be impractical to optimize for D using a quantum processor. Conversely, the Boolean weights $w_i$ may be discrete and well-suited to be optimized using a quantum processor. Thus, in accordance with the present methods, the back-and-forth optimization procedure described above may be performed using both a quantum processor and a non-quantum processor (e.g., a digital processor or a classical analog processor), where the quantum processor is used to optimize (i.e., minimize) equation 2 for the Boolean weights $w_i$ corresponding to any given dictionary D and the non-quantum processor is used to optimize (i.e., minimize) equation 2 for the dictionary D corresponding to any given assignment of Boolean weights $w_i$.

For example, for a given D each $w_i$ ($1 \le i \le S$) can be optimized separately as a QUBO:

$$w_i(D) = \underset{w_i}{\operatorname{argmin}} \{w_i^T D^T D w_i + \langle \lambda 1 - 2 D^T y_i, w_i \rangle\} \tag{4}$$

with $w_i(\alpha) \in \{0, 1\}$ for all components $\alpha$.
and in accordance with the present methods, this optimization may be performed using a quantum processor, such as an adiabatic quantum processor or a processor designed to implement quantum annealing.

The optimization over D for a given setting of $w_i$ may be accomplished using, e.g., a non-quantum processor as follows: write $d = D(:)$ (i.e., stack the columns of D in a vector) so that $Dw = (w^T \otimes I_N)d$ for any K×1 vector w. The optimization objective determining d is:

$$d^T \left( \sum_{i=1}^{S} w_i w_i^T \otimes I_N \right) d - \left( 2 \sum_{i=1}^{S} y_i^t (w_i^T \otimes I_N) \right) d$$

which has minimum:

$$d(\{w_i\}) = \left( \left( \sum_{i=1}^{S} w_i w_i^T \right)^{-1} \otimes I_N \right) \left( \sum_{i=1}^{S} (w_i \otimes I_N) y_i \right).$$

If there are fewer than K training examples then $\Sigma_i w_i w_i^T$ may not have full rank. In such cases, the singular value decomposition of $\Sigma_i w_i w_i^T$ may be used to find the solution with minimum norm $\|d\|_2$. The restriction to Boolean-valued weights $w_i$ may, for example, rule out the possibility of negative contributions of dictionary atoms. However, there may be no need to explicitly allow the weights to be negative as this may be accounted for in the dictionary learning. For example, doubling the number of w variables and writing $y_i = D(w_i^+ - w_i^-)$ with both $w_i^+$ and $w_i^-$ being Boolean-valued simply doubles the size of the dictionary so that $y_i = \tilde{D} \tilde{w}_i$ where $\tilde{D} = [D - D]$ and $\tilde{w}_i^T = [(w_i^+)^T (w_i^-)^T]$.

The sparsity penalty $\lambda$ may, for example, be set by partitioning the training data into a training group $D_{train}$ and a testing group $D_{test}$. On the training group $D_{train}$ the dictionary $D(\lambda)$ may be learned at a given value of $\lambda$. On the testing group the reconstruction error may be measured:

$$\text{error}(\lambda) = \sum_{y_i \in D_{test}} \left\{ \min_{\{w_i\}} \|y_i - D(\lambda)w_i\|_2^2 \right\}$$

Thus, it can be advantageous to choose a $\lambda$ that minimizes error($\lambda$). In practice, error($\lambda$) may be estimated with more than this single fold.

The connectivity of the QUBO defined by equation 4 may be determined by $D^T D$ and in general may be fully connected. However, imposing additional structure can simplify the QUBO optimization. The present methods describe how to learn dictionaries respecting these additional constraints so that, for example, the resultant QUBO can be optimized on quantum processor hardware having qubit connectivity $C_n$ specified by an adjacency matrix A, where $C_n$ may not be fully connected. As previously described, the $Q_{ij}$ elements of the typical QUBO formulation (i.e., equation 3) may be given by $(D^T D)_{ij} = d_i^T d_j$. In mapping (e.g., equation 4) to a quantum processor having incomplete connectivity $C_n$, a pair of uncoupled qubits i and j require $d_i^T d_j = 0$, or that $d_i$ and $d_j$ are orthogonal. Depending on the dimensionality of the input signal N and the number of dictionary elements K there may not be a way to define D so that $D^T D$ has $C_n$ connectivity. In such cases, the compression mechanism may be modified.

However, assuming that N>>K and that it is possible to construct a dictionary D for any connectivity $C_n$, the ($\alpha$, $\alpha'$) element of $D^T D$ (which determines the connectivity between Boolean variables $w_i(\alpha)$ and $w_i(\alpha')$) is $<d^{(\alpha)}, d^{(\alpha')}>$ where $D=[d^{(1)} \ldots d^{(K)}]$ and $d^{(\alpha)}$ and $d^{(\alpha')}$ are columns of D. Thus, specifying a connectivity $C_n$ for the K×K matrix $D^T D$ is equivalent to associating vectors with graphs of K vertices so that the vectors of unconnected vertices are orthogonal. Whether or not this can be done for a given graph structure G=(V, E) depends both on the connectivity E, and the dimensionality of the atoms $d^{(\alpha)}$. In general, associating vectors with graphs of K vertices so that the vectors of unconnected vertices are orthogonal can be accomplished if the dimensionality of the vectors equals K=|V|. However, in accordance with the present methods, this may be improved by finding a representation in d≥1 dimensions where the minimum degree node has at least |V|−d neighbors. For example, a quantum processor architecture having a connectivity with minimum degree of 5 may need at least K−5 dimensions.

As previously described, for a given dictionary D the weights $w_i$ in equations 2 and/or 4 may be optimized using a quantum processor, for example a quantum processor implementing adiabatic quantum computation and/or quantum annealing. On the other hand, for a given assignment of Boolean variable(s) $w_i$ the dictionary D may be optimized using, for example, a non-quantum processor such as a classical digital processor or a classical analog processor.

Assuming that N is sufficiently large, the dictionary may be adapted while respecting the connectivity constraints of $D^T D$. A block coordinate descent may be applied starting from some initial dictionary $D^{(0)}$ satisfying the required orthogonality constraints. Using, for example, the Lovasz orthogonality construction (L. Lovasz, M. Saks, and A. Schrijver, *A correction: Orthogonal representations and connectivity of graphs*. Linear Alg. Appl., pages 101-105, 2000), an initial dictionary may be found when N≥K. From the starting dictionary $D^{(0)}$, a processor may be used to update the weights to $w^{(1)} \leftarrow w(D^{(0)})$ (using, e.g., equation 4). For example, a quantum processor may be used to update the initial weights $w^{(1)}$. Once the weights are updated for the starting dictionary $D^{(0)}$, a processor may be used to update the dictionary to $D^{(1)} \leftarrow D(w^{(1)})$ where $D=[d^{(1)} \ldots d^{(K)}]$, and:

$$D(w) = \underset{\tilde{d}^{(1)},\ldots,\tilde{d}^{(K)}}{\operatorname{argmin}} \sum_{i=1}^{S} \left\{ \|y_i - \tilde{D}w_i\|_2^2 + \lambda \langle 1, w_i \rangle \right\}$$

$$\text{subject to } A_{\alpha,\alpha'} = 0 \Rightarrow \langle \tilde{d}^{(\alpha)}, \tilde{d}^{(\alpha')} \rangle = 0.$$

In principle, the present methods may accommodate any adjacency matrix $A_{\alpha,\alpha'}$. The dictionary interactions may be customized to suit any aspect of the problem or of the processor(s) being used to solve the problem. Thus, in some applications it may be advantageous to deliberately craft the adjacency matrix $A_{\alpha,\alpha'}$ so that the resulting QUBO problem has connectivity that matches that of the quantum processor, or at least connectivity that is amenable to being mapped to the quantum processor. In accordance with the present methods, the QUBO problems stemming from the dictionary interactions may be made particularly well-suited to be solved by a quantum processor by restricting the dictionary to match the connectivity of the quantum processor.

A non-quantum processor such as a digital processor or a classical analog processor may be used, for example, to update the dictionary to $D^{(1)}$. Following this procedure, the update equations $w^{(t+1)} \leftarrow w(D^{(t)})$ and $D^{(t+1)} \leftarrow D(w^{(t+1)})$ may be iterated to convergence to a minimum of equation 2, such as a global minimum or a local minimum.

As previously described, the QUBO minimizations for w(D) may be performed using a quantum processor implementing, for example, adiabatic quantum computation or quantum annealing. The dictionary optimization problem, however, may be addressed using a non-quantum processor because, for example, D may be continuous. For example, local search approaches may be implemented whereby a small subset of the dictionary is improved. If localModification(D) yields a locally improved dictionary, then the overall structure of the optimization is given in Algorithm. 1:

---
Algorithm 1 QUBO constrained dictionary learning
---
Require: training data $\{y_i\}$
Ensure: a dictionary D with which each $y_i$ may be represented sparsely as $y_i = Dw_i$
    Initialize $D^{(0)}$, $t \leftarrow 0$
    while D not converged do
        update $w^{(t)} \leftarrow w(D^{(t)})$ using a QUBO solver
        $D^{(t+1)} \leftarrow D^{(t)}$
        for step<numModifications do
            $D^{(t+1)} \leftarrow$ localModification($D^{(t+1)}$)
        $t \leftarrow t+1$.
    return $D^{(t)}$.

---

The number of local modifications used between w updates is a parameter of the algorithm. Thus, such local search approaches may be broken down into a variety of localModification(D) modifications, including single-column modifications, two-column modifications, and more-than-two-column modifications.

An exemplary procedure for single-column modifications is now described. Consider updating a single column (say column 1) and write $D=[d^{(1)} \tilde{D}]$. $d^{(1)}$ may lie in the orthogonal complement of those columns of $\tilde{D}$ which are non-neighbors of node 1 and null spaces of D may refer to non-neighboring columns of D which must be orthogonal. Then, $d^{(1)}=N^{(1)}t^{(1)}$ where the columns of $N^{(1)}$ define a basis for the null space of $\tilde{D}^T$. Thus, most generally $D=[N^{(1)}t^{(1)} \tilde{D}]$. To optimize all parameters, block coordinate descent may be applied. The $\{w_i\}$ block coordinate minimizations may be carried out using QUBO minimization of equation 4 as before. To determine $d^{(1)}$ for a given $\tilde{D}$ and $\{w_i\}$, minimize for the reconstruction error $$t_*^{(1)} = \operatorname*{argmin}_t \sum_{i=1}^S \|y_i - \tilde{D}\tilde{w}_i - N^{(1)}tw_i^{(1)}\|_2^2 = \operatorname*{argmin}_t \left\{ \frac{\tilde{w}^{(1)}}{2}\|t\|_2^2 - v^T t \right\}$$

where $$w_i = \begin{bmatrix} w_i^{(1)} \\ \tilde{w}_i \end{bmatrix}, \tilde{w}^{(1)} \equiv \sum_{i=1}^S w_i^{(1)}, \text{ and } v^{(1)} \equiv (N^{(1)})^T \sum_{i=1}^S w_i^{(1)} \{y_i - \tilde{D}\tilde{w}_i\}.$$

The minimization over t yields $t_*^{(1)}=v/\tilde{w}^{(1)}$ so that $d^{(1)}=N^{(1)}v^{(1)}/\tilde{w}^{(1)}$. This update rule may not be applicable when column 1 is never used, i.e., $\tilde{w}^{(1)}=0$. In this case, it can be advantageous to try to set $d^{(1)}$ so that column 1 is more likely to be used at subsequent iterations. Note the reconstruction error at $t_*^{(1)}$ is $-\|v^{(1)}\|_2^2/(2\tilde{w}^{(1)})$ so that if a single bit is turned on one training example (i.e., so_that $\tilde{w}^{(1)}=1$) the training example most likely to utilize the new column is $i_*=\arg\max_i \|(N^{(1)})^T(y_i-\tilde{D}\tilde{w}_i)\|_2^2$. With this selection, $d^{(1)}=\check{N}^{(1)}(N^{(i)})^T(y_{i_*}-\tilde{D}\tilde{w}_{i_*})$.

An exemplary procedure for a two-column modification is now described. Two columns $d^{(1)}$ and $d^{(2)}$ of D may, for example, be optimized simultaneously. The optimization approach may branch depending on whether the columns are neighbors in A or non-neighbors.

In instances where the columns $d^{(1)}$ and $d^{(2)}$ correspond to neighboring nodes so that there are no additional orthogonality constraints between $d^{(1)}$ and $d^{(2)}$, $D=[N^{(1)}t^{(1)} N^{(2)}\bar{t}^{(2)} \tilde{D}]$. The optimal linear combinations may be obtained as:

$$t_*^{(1)}, t_*^{(2)} = \operatorname*{argmin}_{t^{(1)},t^{(2)}} \sum_{i=1}^S \|y_i - \tilde{D}\tilde{w}_i - N^{(1)}t^{(1)}w_i^{(1)} - N^{(2)}t^{(2)}w_i^{(2)}\|_2^2$$

$$= \operatorname*{argmin}_{t^{(1)},t^{(2)}} \left\{ [(t^{(1)})^T (t^{(2)})^T] \begin{bmatrix} \tilde{w}^{(1)}I^{(1)} & \tilde{w}^{(1,2)}(N^{(1)})^T N^{(2)} \\ \tilde{w}^{(1,2)}(N^{(2)})^T N^{(1)} & \tilde{w}^{(2)}I^{(2)} \end{bmatrix} \begin{bmatrix} t^{(1)} \\ t^{(2)} \end{bmatrix} - 2[(v^{(1)})^T (v^{(2)})^T] \begin{bmatrix} t^{(1)} \\ t^{(2)} \end{bmatrix} \right\}$$

with $$v^{(1)} = (N^{(1)})^T r^{(1)} \text{ with } r^{(1)} \equiv \sum_{i=1}^S w_i^{(1)}\{y_i - \tilde{D}\tilde{w}_i\},$$

$$v^{(2)} = (N^{(2)})^T r^{(2)} \text{ with } r^{(2)} \equiv \sum_{i=1}^S w_i^{(2)}\{y_i - \tilde{D}\tilde{w}_i\},$$

$$\tilde{w}^{(1)} = \sum_{i=1}^S w_i^{(1)},$$

$$\tilde{w}^{(1,2)} = \sum_{i=1}^S w_i^{(1)} w_i^{(2)},$$

$$\tilde{w}^{(2)} = \sum_{i=1}^S w_i^{(2)}.$$

where $r^{(1)}$ and $r^{(2)}$ are weighted error residuals. The matrix coupling $t^{(1)}$ and $t^{(2)}$ may then be inverted as:

$$\begin{bmatrix} X^{-1} & -\tilde{w}^{(1,2)}(N^{(1)})^T N^{(2)} Y^{-1}/\tilde{w}^{(1)} \\ -\tilde{w}^{(1,2)}(N^{(2)})^T N^{(1)} X^{-1}/\tilde{w}^{(2)} & Y^{-1} \end{bmatrix}$$

where $X = \tilde{w}_1 I^{(1)} - (\tilde{w}^{(1,2)})^2 (N^{(1)})^T N^{(2)} (N^{(2)})^T N^{(1)}/\tilde{w}^{(2)}$ $Y = \tilde{w}_2 I^{(2)} - (\tilde{w}^{(1,2)})^2 (N^{(2)})^T N^{(1)} (N^{(1)})^T N^{(2)}/\tilde{w}^{(1)}$ so that $$\begin{bmatrix} t_*^{(1)} \\ t_*^{(2)} \end{bmatrix} = \begin{bmatrix} X^{-1}v^{(1)} - (\tilde{w}^{(1,2)}/\tilde{w}^{(1)})(N^{(1)})^T N^{(2)} Y^{-1}v^{(2)} \\ Y^{-1}v^{(2)} - (\tilde{w}^{(1,2)}/\tilde{w}^{(2)})(N^{(2)})^T N^{(1)} X^{-1}v^{(1)} \end{bmatrix}.$$

In the case where $\tilde{w}^{(1)}\tilde{w}^{(2)}=(\tilde{w}^{(1,2)})^2$, the matrix is singular and its pseudo-inverse may be used. If either of $\tilde{w}^{(1)}$, or $\tilde{w}^{(2)}$ are zero, the same counterfactual argument may be applied to set the column to minimize the reconstruction error of the example with the largest error.

In instances where the two columns $d^{(1)}$ and $d^{(2)}$ correspond to non-neighbors, it may be required that:

$$d_*^{(1)}, d_*^{(1)} = \operatorname*{argmin}_{d^{(1)},d^{(2)}} \{\tilde{w}^{(1)}\|d^{(1)}\|_2^2 - 2\langle r^{(1)}, d^{(1)}\rangle + \tilde{w}^{(2)}\|d^{(2)}\|_2^2 - 2\langle r^{(2)}, d^{(2)}\rangle\}$$

with: $\left[\langle d^{(1)}, d^{(2)}\rangle = 0\right] \wedge [d^{(1)} \in \operatorname{span}(N^{(1)})] \wedge [d^{(2)} \in \operatorname{span}(N^{(2)})].$ The quadratic orthogonality constraint and the non-convex nature of the feasible set can make this problem difficult. To find a local minimum, the KKT equations may be solved for the orthogonality constraint. The Lagrangian is:

$$L(t^{(1)}, t^{(2)}, \mu) = [(t^{(1)})^T (t^{(2)})^T] \begin{bmatrix} \tilde{w}^{(1)}I^{(1)} & \mu(N^{(1)})^T N^{(2)} \\ \mu(N^{(2)})^T N^{(1)} & \tilde{w}^{(2)}I^{(2)} \end{bmatrix} \begin{bmatrix} t^{(1)} \\ t^{(2)} \end{bmatrix} - 2[(v^{(1)})^T (v^{(2)})^T] \begin{bmatrix} t^{(1)} \\ t^{(2)} \end{bmatrix}$$

where $\mu$ is the Lagrange multiplier for the orthogonality constraint. The KKT conditions are $$\begin{bmatrix} \tilde{w}^{(1)}I^{(1)} & \mu(N^{(1)})^T N^{(2)} \\ \mu(N^{(2)})^T N^{(1)} & \tilde{w}^{(2)}I^{(2)} \end{bmatrix} \begin{bmatrix} t^{(1)} \\ t^{(2)} \end{bmatrix} = \begin{bmatrix} v^{(1)} \\ v^{(2)} \end{bmatrix}$$

$$(t^{(1)})^T (N^{(1)})^T N^{(2)} t^{(2)} = 0$$

Defining $$t \equiv \begin{bmatrix} t^{(1)} \\ t^{(2)} \end{bmatrix},$$

$$\mathcal{I} \equiv \begin{bmatrix} \tilde{w}^{(1)}I^{(1)} & 0 \\ 0 & \tilde{w}^{(2)}I^{(2)} \end{bmatrix},$$

$$A \equiv \begin{bmatrix} 0 & (N^{(1)})^T N^{(2)} \\ (N^{(2)})^T N^{(1)} & 0 \end{bmatrix}$$

the KKT equations may be written as $M(\mu)t=v$ and $t^T A t=0$.

where $M(\mu)=\mathcal{I}+\mu A$. Solutions to these equations may be found as follows.

If $M(\mu)$ is not singular, then it is unlikely that $t=M^{-1}(\mu)v$ satisfies the orthogonality constraint $<M^{-1}(\mu)v, AM^{-1}(\mu)v>=0$. Thus, to solve the KKT equations, it may be necessary to set $\mu$ to make $M(\mu)$ singular so that $t=M(\mu)^+v+V\tau$, where $M^+$ is the Moore-Penrose inverse of M and V is a basis for the null space of $M(\mu)$. This way, there is likely to be sufficient freedom to set $\tau$ to maintain orthogonality. Note that $$\mu^* = \sqrt{\tilde{w}^{(1)}\tilde{w}^{(2)}}$$

makes $M(\mu)$ singular as:

$$M(\mu^*) = \begin{bmatrix} \sqrt{\tilde{w}^{(1)}} (N^{(1)})^T \\ \sqrt{\tilde{w}^{(2)}} (N^{(2)})^T \end{bmatrix} \begin{bmatrix} \sqrt{\tilde{w}^{(1)}} N^{(1)} & \sqrt{\tilde{w}^{(2)}} N^{(2)} \end{bmatrix} \equiv \hat{A}^T \hat{A}$$

with $$\hat{A} = \begin{bmatrix} \sqrt{\tilde{\omega}^{(1)}} N^{(1)} & \sqrt{\tilde{\omega}^{(2)}} N^{(2)} \end{bmatrix}.$$

In some instances, $t = v_{\mu^*} + V\tau$ where $v_{\mu^*} = M^+(\mu^*)v$ where V is a basis for the null space of $\hat{A}$. The coefficients $\tau$ may be set by requiring that the last orthogonality equation be solved:

$$\tau^T V^T A V \tau + 2 v_{\mu^*}^T A V \tau + v_{\mu^*}^T A v_{\mu^*} = 0$$

But $AV = (M(\mu^*)V - \mathcal{I}V)/\mu^* = -\mathcal{I}V/\mu^*$, so that $$\tau^T V^T \mathcal{I} V\tau + 2 v_{\mu^*}^T \mathcal{I} V\tau = \mu^* v_{\mu^*}^T A v_{\mu^*}$$

$$(V\tau + v_{\mu^*})^T \mathcal{I} (V\tau + v_{\mu^*}) = v_{\mu^*}^T M(\mu^*) v_{\mu^*} = v^T M^+(\mu^*) v = \langle v, v_{\mu^*} \rangle$$

This last equation may be solved by finding a vector r on the ellipsoid $r^T \mathcal{I} r = \langle v, v_{\mu^*} \rangle$ and setting $\tau = V^T(r - v_{\mu^*})$. Substituting in for t, it follows that $t = (I - VV^T)v_{\mu^*} + VV^T r$.

An exemplary procedure for a more-than-two-column update is now described. This may be accomplished by, for example, extending the two-column update based on the KKT conditions to optimize for larger numbers of columns. As an example, consider the KKT equations for 3 columns (variables), two of which neighbor a central variable. If the two neighbors of the central variable are not neighbors of each other, then a single multiplier may need to be introduced. In this case the KKT equations are:

$$\begin{bmatrix} \tilde{w}^{(1)}I^{(1)} & \tilde{w}^{(1,2)}(N^{(1)})^T N^{(2)} & \mu(N^{(1)})^T N^{(3)} \\ \tilde{w}^{(1,2)}(N^{(2)})^T N^{(1)} & \tilde{w}^{(2)}I^{(2)} & \tilde{w}^{(2,3)}(N^{(2)})^T N^{(3)} \\ \mu(N^{(3)})^T N^{(1)} & \tilde{w}^{(2,3)}(N^{(3)})^T N^{(2)} & \tilde{w}^{(3)}I^{(3)} \end{bmatrix} \begin{bmatrix} t^{(1)} \\ t^{(2)} \\ t^{(3)} \end{bmatrix} = \begin{bmatrix} v^{(1)} \\ v^{(2)} \\ v^{(3)} \end{bmatrix}$$

$$(t^{(1)})^T (N^{(1)})^T N^{(3)} t^{(3)} = 0$$

where (2) denotes the central spin and (1) and (3) are the neighbors of (2) which are not neighbors of each other. In this case, $$I = \begin{bmatrix} \tilde{w}^{(1)}I^{(1)} & \tilde{w}^{(1,2)}(N^{(1)})^T N^{(2)} & 0 \\ \tilde{w}^{(1,2)}(N^{(2)})^T N^{(1)} & \tilde{w}^{(2)}I^{(2)} & \tilde{w}^{(2,3)}(N^{(2)})^T N^{(3)} \\ 0 & \tilde{w}^{(2,3)}(N^{(3)})^T N^{(2)} & \tilde{w}^{(3)}I^{(3)} \end{bmatrix},$$

$$A = \begin{bmatrix} 0 & 0 & (N^{(1)})^T N^{(3)} \\ 0 & 0 & 0 \\ (N^{(3)})^T N^{(1)} & 0 & 0 \end{bmatrix}$$

so that $M(\mu)t = v$ and $t^T A t = 0$, where $M(\mu) = \mathcal{I} + \mu A$. In this case, determining $\mu$ so that $M(\mu)$ is singular may be less straightforward. However, by defining:

$$\hat{A} = \begin{bmatrix} \gamma_{1,1} N^{(1)} & \gamma_{1,2} N^{(2)} & \gamma_{1,3} N^{(3)} \\ \gamma_{2,1} N^{(1)} & \gamma_{2,2} N^{(2)} & \gamma_{2,3} N^{(3)} \end{bmatrix}$$

it follows that:

$$\hat{A}^T \hat{A} = \begin{bmatrix} (\gamma_{1,1}\gamma_{1,1} + \gamma_{2,1}\gamma_{2,1})I^{(1)} & (\gamma_{1,1}\gamma_{1,2} + \gamma_{2,1}\gamma_{2,2})(N^{(1)})^T N^{(2)} & (\gamma_{1,1}\gamma_{1,3} + \gamma_{2,1}\gamma_{2,3})(N^{(1)})^T N^{(3)} \\ (\gamma_{1,2}\gamma_{1,1} + \gamma_{2,2}\gamma_{2,1})(N^{(2)})^T N^{(1)} & (\gamma_{1,2}\gamma_{1,2} + \gamma_{2,2}\gamma_{2,2})I^{(2)} & (\gamma_{1,2}\gamma_{1,3} + \gamma_{2,2}\gamma_{2,3})(N^{(2)})^T N^{(3)} \\ (\gamma_{1,3}\gamma_{1,1} + \gamma_{2,3}\gamma_{2,1})(N^{(3)})^T N^{(1)} & (\gamma_{1,3}\gamma_{1,2} + \gamma_{2,3}\gamma_{2,2})(N^{(3)})^T N^{(2)} & (\gamma_{1,3}\gamma_{1,3} + \gamma_{2,3}\gamma_{2,3})I^{(3)} \end{bmatrix}.$$

Similarly, defining:

$$\Gamma = \begin{bmatrix} \gamma_{1,1} & \gamma_{1,2} & \gamma_{1,3} \\ \gamma_{2,1} & \gamma_{2,2} & \gamma_{2,3} \end{bmatrix}$$

leads to $\hat{A}^T \hat{A} = M(\mu)$, provided that:

$$\Gamma^T \Gamma = \begin{bmatrix} \tilde{w}^{(1)} & \tilde{w}^{(1,2)} & \mu \\ \tilde{w}^{(1,2)} & \tilde{w}^{(2)} & \tilde{w}^{(2,3)} \\ \mu & \tilde{w}^{(2,3)} & \tilde{w}^{(3)} \end{bmatrix}.$$

Thus, $M(\mu)$ can be made singular by, for example, setting $\mu$ to solve the equation for $\Gamma^T \Gamma$ above, which may be done with the choice:

$$\Gamma = \begin{bmatrix} \sqrt{w^{(1)}} \cos\theta^{(1)} & \sqrt{w^{(2)}} \cos\theta^{(2)} & \sqrt{w^{(3)}} \cos\theta^{(3)} \\ \sqrt{w^{(1)}} \sin\theta^{(1)} & \sqrt{w^{(2)}} \sin\theta^{(2)} & \sqrt{w^{(3)}} \sin\theta^{(3)} \end{bmatrix}$$

where $$\frac{\tilde{w}^{(1,2)}}{\sqrt{\tilde{w}^{(1)}\tilde{w}^{(2)}}} = \cos(\theta^{(1)} - \theta^{(2)})$$

and $$\frac{\tilde{w}^{(2,3)}}{\sqrt{\tilde{w}^{(2)}\tilde{w}^{(3)}}} = \cos(\theta^{(2)} - \theta^{(3)}).$$

Given any choice for $\theta_*^{(1)}, \theta_*^{(2)}, \theta_*^{(3)}$ satisfying the above two equations, $M(\mu^*)$ can be made singular by setting $$\mu^* = \sqrt{\tilde{w}^{(1)}\tilde{w}^{(3)}} \cos(\theta_*^{(1)} - \theta_*^{(3)})).$$

Knowing $\mu^*$, the singular value decomposition:

$usv^T = \hat{A}$ (from which $M(\mu^*) = vs^Tsv^T$) may be used to determine the null space and $t = v_{\mu^*} + V\tau$ where $v_{\mu^*} = M^+(\mu^*)v$. $\tau$ may then be determined as it was in the 2-column non-neighbor case.

Newton's method may be used. Let $v(\mu)$ be the function giving the eigenvalue of $\hat{M}(\mu)$ nearest to 0 (this can be obtained with an iterative Lanczos method which may converge quickly given a good starting point. A good starting point is available, for example, using the eigenvector at a nearby p obtained at the last Newton step). Solving $v(\mu)=0$ using Newton's method can be accelerated by, for example, supplying the derivative $\delta_\lambda v(\mu)$ as $<a, Aa>$ where a is the eigenvector corresponding to the eigenvalue nearest to 0. Knowing $\mu^*$ satisfying $v(\mu^*)=0$, a singular value decomposition of $VSV^T = M(\mu^*)$ may be performed to provide $t = v_{\mu^*} + V\tau$ where $v_{\mu^*} = M^+(\mu^*)v$. $\tau$ may then be determined exactly as it was in the two-column update non-neighbors case described above.

Improved reconstruction may be obtained with larger numbers of dictionary atoms (i.e., larger K). In order to satisfy the orthogonality constraints when learning constrained dictionaries with N<K, the input signals may be mapped to a space having dimension of at least K. This mapping may be linear and given as By. The dictionary may then be learned to sparsely represent the mapped $y_i$ by minimizing:

$$\sum_{i=1}^{s} \{\|By_i - Dw_i\|_2^2 + \lambda\langle 1, w_i\rangle\} \text{ subject to } \|B\|_F = 1$$

where the Frobenius norm of B may be fixed to prevent the solution of B=0, D=0, and $\{w_i\}=0$. Block coordinate decent may be used to minimize the objective with respect to B, D and $\{w_i\}$. The B minimization may be relatively straightforward because the objective is quadratic and the constraint is simple. Having learned all parameters, the reconstruction from a known w may be achieved by $$y = (\overline{B}^T B)^{-1} \overline{B}^T Dw.$$

In accordance with the present methods, solving a QUBO problem may include an implementation of quantum annealing or adiabatic quantum computation. As previously discussed, a typical adiabatic evolution may be represented by equation 5:

$$H_e = (1-s)H_{In} + sH_f \quad (5)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M. H. S., "Effect of local minima on quantum adiabatic optimization", PRL 100, 130503 (2008), is to start with an initial Hamiltonian of the form shown in equation 6:

$$H_{In} = -\frac{1}{2}\sum_{i=1}^{n} \Delta_i \sigma_i^x \quad (6)$$

where n represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{n} h_i \sigma_i^z + \sum_{i,j=1}^{n} J_{ij}\sigma_i^z\sigma_j^z\right] \quad (7)$$

where n represents the number of qubits, $\sigma_i^z$ is the Pauli z-matrix for the $i^{th}$ qubit, $h_i$ and $J_{i,j}$ are dimensionless local fields coupled into each qubit, and $\epsilon$ is some characteristic energy scale for $H_f$. Here, the o and $\sigma_i^z$ and $\sigma_i^z\sigma_j^z$ terms are examples of "diagonal" terms. Throughout this specification and the appended claims, the terms "final Hamiltonian" and "problem Hamiltonian" are used interchangeably. In various embodiments of the present methods, a minimization problem is converted to a QUBO, and the QUBO is mapped directly to the problem Hamiltonian in the processor hardware. Hamiltonians such as $H_{In}$ and $H_f$ in equations 6 and 7, respectively, may be physically realized in a variety of different ways. A particular example is realized by an implementation of superconducting qubits.

FIG. 1 is a schematic diagram of a portion of a superconducting quantum processor 100 designed for AQC (and/or quantum annealing). The portion of superconducting quantum processor 100 shown in FIG. 1 includes two superconducting qubits 101, 102 and a tunable ZZ-coupler 111 coupling information therebetween. While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC by initializing the system with the Hamiltonian described by equation 6 and evolving the system to the Hamiltonian described by equation 7 in accordance with the evolution described by equation 5. In various embodiments of the present methods, determining a low energy state, such as the ground state, of the Hamiltonian described by equation 7 may map directly to a QUBO problem, where the QUBO problem encodes a minimization problem such as the sparse least squares problem. This mapping between the QUBO and the problem Hamiltonian is achieved, at least in part, by the programmable assignments to the parameters in the Hamiltonian described by equation 7. Evolving the quantum processor 100 to determine the ground state of the Hamiltonian described by equation 7 therefore solves the QUBO problem, which effectively solves the minimization problem. Quantum processor 100 includes a plurality of programming interfaces 121-125 that are used to configure and control the state of quantum processor 100. Each of programming interfaces 121-125 may be realized by a respective inductive coupling structure, as illustrated, that communicates with a programming system (not shown). Such a programming system may be separate from quantum processor 100, or it may be included locally (i.e., on-chip with quantum processor 100) as described in U.S. Pat. No. 7,876, 248 (corresponding to Publication 2008-0215850) and U.S. Pat. No. 8,035,540.

In the operation of quantum processor 100, programming interfaces 121 and 124 may each be used to couple a flux signal into a respective compound Josephson junction 131, 132 of qubits 101 and 102, thereby realizing the $\Delta_i$ terms in the system Hamiltonian. This coupling provides the off-diagonal $\sigma^x$ terms of the Hamiltonian described by equation 6 and these flux signals are examples of "disordering signals.". Similarly, programming interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of equation 7. Furthermore, programming interface 125 may be used to couple a flux signal into coupler 111, thereby realizing the $J_{ij}$ terms in the system Hamiltonian. This coupling provides the diagonal $\sigma^z_i \sigma^z_j$ terms of equation 7. In FIG. 1, the contribution of each of programming interfaces 121-125 to the system Hamiltonian is indicated in boxes 121a-125a, respectively.

Throughout this specification and the appended claims, the term "quantum processor" is used to generally describe a collection of qubits (e.g., qubits 101 and 102) and couplers (e.g., coupler 111). The qubits 101 and 102 and the couplers 111 are referred to as the "computational elements" of the quantum processor 100. In the context of a quantum processor, the term "programming subsystem" is used to generally describe the programming elements (e.g., programming interfaces 122, 123, and 125) included in a quantum processor (e.g., processor 100) and other associated control circuitry or instructions. As previously described, the programming elements of the operational subsystem may communicate with a programming system which may be separate from the quantum processor or included locally on the processor. Similarly, in the context of a quantum processor, the term "evolution subsystem" is used to generally describe the evolution elements 121, 124 used to evolve the computational elements of the quantum processor 100. For example, the evolution subsystem may include annealing signal lines and their corresponding interfaces (121, 124) to the qubits (101, 102).

The exemplary quantum processor described in FIG. 1 may be used to minimize the QUBO problem of equation 4 to determine values for the Boolean weights $w_1$ for a given dictionary $D_0$. Using the determined values for the Boolean weights $w_1$, a non-quantum processor may then be used to optimize equation 2 for the dictionary D to produce a new dictionary $D_1$. The exemplary quantum processor described in FIG. 1 may then be used to minimize the QUBO problem of equation 4 to determine values for the Boolean weights $w_2$ for the new dictionary $D_1$, and a non-quantum processor may then use the new Boolean weights $w_2$ to optimize equation 2 to produce a new dictionary $D_2$. This process may continue until some solution criterion is met, such as convergence of the weights $w_i$ and/or dictionary D.

The various embodiments described herein provide methods for using a quantum processor to solve computational problems by employing techniques of compressed sensing. In general, these methods involve successively optimizing an objective (e.g., equation 2), where each successive optimization alternates between optimizing for a first parameter (e.g., a dictionary D) and a second parameter (e.g., Boolean weights $w_i$).

Figure 2:
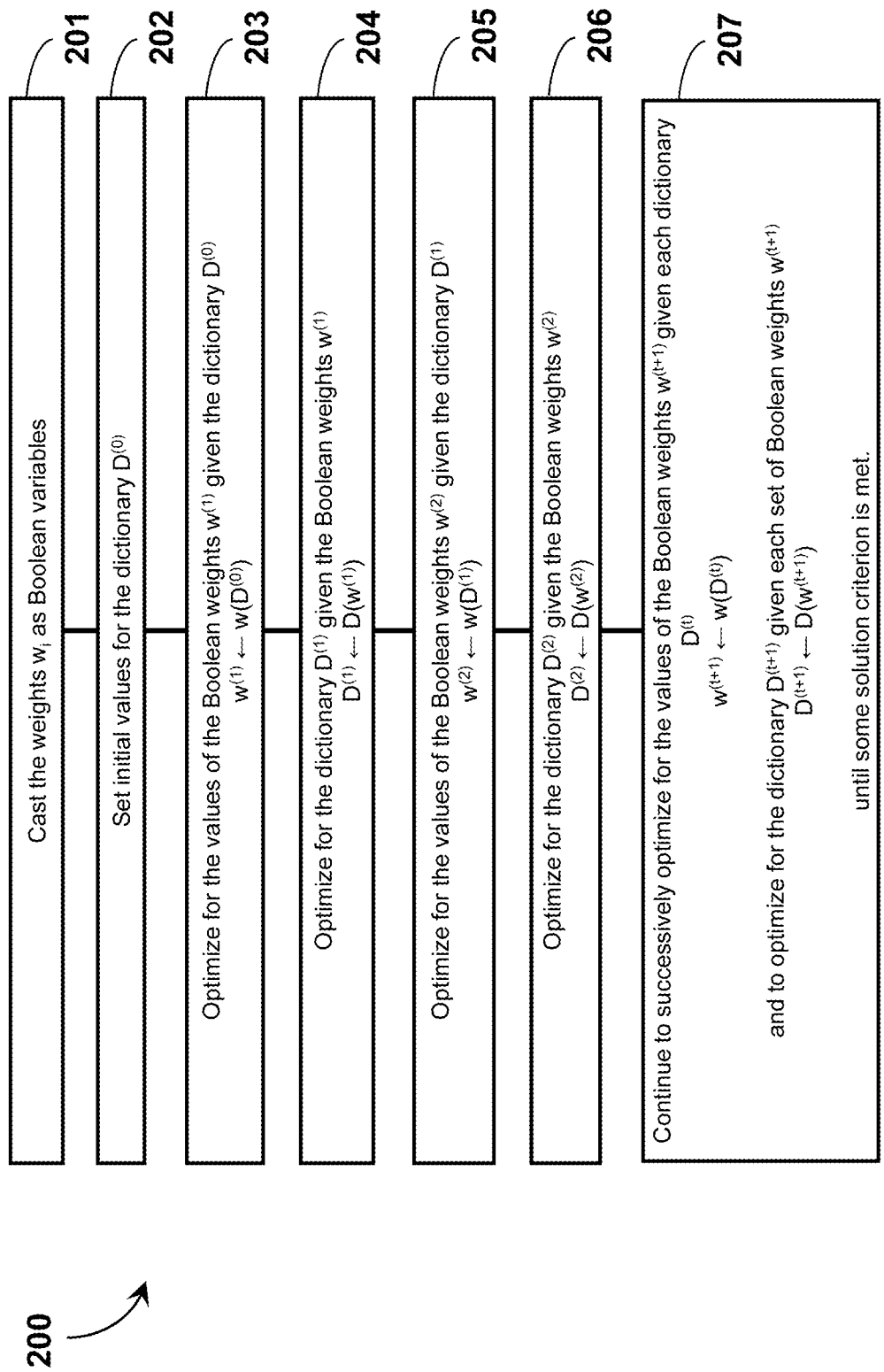
FIG. 2 is a flow-diagram showing a method for minimizing an objective in accordance with the present methods.

FIG. 2 is a flow-diagram showing a method 200 for minimizing the objective given in equation 1. Method 200 includes seven acts 201-207, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 201, the weights in the sparse least squares problem of equation 1 are re-cast as Boolean variables so that equation 1 is mapped to equation 2. Re-casting the weights $w_i$ as Boolean variables enables equation 1 to be mapped to a QUBO problem which is well-suited to be optimized using a quantum processor. This mapping may be performed using, for example, a non-quantum processor, such as a digital processor. At 202, initial values for the dictionary D in equation 2 are set. The initial values for the dictionary D correspond to $D_0$. The initial values for the dictionary $D_0$ may, for example, be set randomly, or by guessing based on some knowledge or criteria. At 203, equation 2 is optimized for the values of the Boolean weights $w_i$ that correspond to the initial values for the dictionary $D_0$. This optimization produces initial values for the Boolean weights given by $w_1$ corresponding to the process $w_1 \leftarrow w(D_0)$ and may be achieved, for example, by using a quantum processor to minimize the QUBO problem given by equation 4. At 204, equation 2 is optimized for the dictionary D that corresponds to the initial values for the Boolean weights $w_1$. This optimization produces a second set of values for the dictionary given by $D_1$ corresponding to the process $D_1 \leftarrow D(w_1)$ and may be achieved, for example, by using a non-quantum processor to update the columns of the dictionary according to the procedures for single-column updates, two-column updates, and/or more-than-two-columns updates previously described.

At 205, equation 2 is optimized for the values of the Boolean weights $w_i$ that correspond to the second set of values for the dictionary $D_1$. This optimization produces a second set of values for the Boolean weights given by $w_2$ corresponding to the process $w_2 \leftarrow w(D_1)$ and may be achieved, for example, by using a quantum processor to minimize the QUBO problem given by equation 4. At 206, equation 2 is optimized for the dictionary D that corresponds to the second set of values for the Boolean weights $w_2$. This optimization produces a third set of values for the dictionary given by $D_2$ corresponding to the process $D_2 \leftarrow D(w_2)$ and may be achieved, for example, by using a non-quantum processor to update the columns of the dictionary according to the procedures for single-column updates, two-column updates, and/or more-than-two-columns updates previously described.

At 207, the back-and-forth optimizations described in acts 203-206 are repeated until some solution criterion is met. That is, equation 2 is successively optimized for the values of the Boolean weights $w_{t+1}$ given each dictionary $D_t$ corresponding to the process $w_{t+1} \leftarrow w(D_t)$ using, for example, a quantum processor to minimize equation 4; and for the dictionary $D_{t+1}$ given each set of Boolean weights $w_{t+1}$ corresponding to the process $D_{t+1} \leftarrow D(w_{t+1})$ using, for example, a non-quantum processor to update the columns of the dictionary $D_{t+1}$. This process may be continued until some solution criterion is met, for example, until at least one of the dictionary D or the set of values for the Boolean weights $w_i$ converges.

At 202 in method 200, the optimization procedure effectively begins by setting initial values for the dictionary $D_0$ and using these values, at 203, to optimize for the values of the Boolean weights $w_1$. However, the optimization procedure may also begin by setting initial values for the Boolean weights $w_1$ and using these values to optimize for the dictionary $D_1$.

Figure 3:
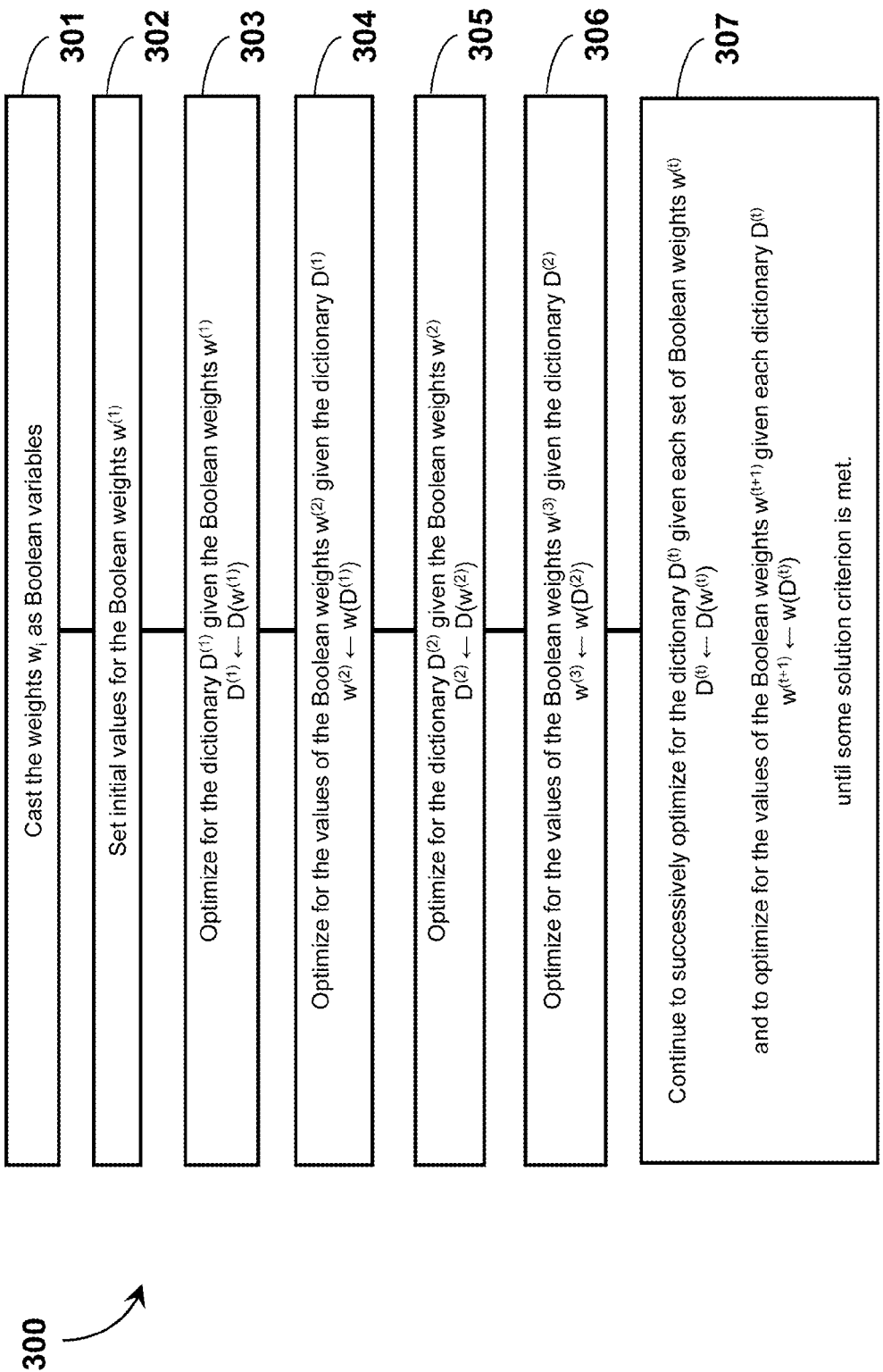
FIG. 3 is a flow-diagram showing a method for minimizing an objective in accordance with the present methods.

FIG. 3 is a flow-diagram of a method 300 for minimizing the objective given in equation 1. Method 300 includes seven acts 301-307, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. Method 300 is substantially similar to method 200 from FIG. 2, except that at 302 of method 300 initial values for the Boolean weights $w_1$ are set, whereas at 202 of method 200 initial values for the dictionary $D_0$ are set. At 302, the initial values for the Boolean weights $w_1$ may be set randomly, or by guessing based on some knowledge or criteria. Method 300 then proceeds through acts 303-307 to successively optimize equation 2 for the dictionary $D_t$ based on the Boolean weights $w_t$ (using, e.g., a non-quantum processor to update the columns of the dictionary) according to the process $D_t \leftarrow D(w_t)$ and for the Boolean weights $w_{t+1}$ based on the dictionary $D_t$ (using, e.g., a quantum processor to minimize the QUBO of equation 4) according to the process $w_{t+1} \leftarrow w(D_t)$ until some solution criterion is met. An exemplary solution criterion is the convergence of the at least one of the dictionary D and the Boolean weights Throughout this specification, various embodiments of the present methods are described in which a non-quantum processor is used to update at least some of the values for a dictionary in an objective, e.g., in a sparse least squares problem. However, in accordance with the present methods, a quantum processor may be employed to update at least some of the values for a dictionary in an objective, e.g., in a sparse least squares problem. For example, the present methods may include employing a quantum processor to optimize an objective for an $n^{th}$ set of values for a dictionary based on an $(n-1)^{th}$ set of values for the Boolean weights (i.e., acts 204, 206, 207, 303, 305, and 307 may employ a quantum processor to optimize for the dictionary) by applying the systems and methods described in U.S. Provisional Patent Application Ser. No. 61/505,044, filed Jul. 6, 2011 and entitled "Applications of Hardware Boltzmann Fits;" U.S. Provisional Patent Application Ser. No. 61/515,742, filed Aug. 5, 2011 and entitled "Applications of Hardware Boltzmann Fits;" U.S. Provisional Patent Application Ser. No. 61/540,208, filed Sep. 28, 2011 and entitled "Applications of Hardware Boltzmann Fits;" U.S. Provisional Patent Application Ser. No. 61/550,275, filed Oct. 21, 2011 and entitled "Systems and Methods for Minimizing an Objective Function;" and U.S. Provisional Patent Application Ser. No. 61/557,783, filed Nov. 9, 2011 and entitled "Systems and Methods for Minimizing an Objective Function." In accordance with the present methods, a quantum processor may also be employed to optimize an objective (e.g., a non-QUBO formulation of an objective) for an $n^{th}$ set of values for the Boolean weights based on an $(n-1)^{th}$ set of values for the dictionary (i.e., acts 203, 205, 207, 304, 306, and 307 may employ a quantum processor to optimize for the Boolean weights) by applying the systems and methods taught in U.S. Provisional Patent Application Ser. No. 61/505,044, filed Jul. 6, 2011 and entitled "Applications of Hardware Boltzmann Fits;" US Provisional Patent Application Ser. No. 61/515,742, filed Aug. 5, 2011 and entitled "Applications of Hardware Boltzmann Fits;" U.S. Provisional Patent Application Ser. No. 61/540,208, filed Sep. 28, 2011 and entitled "Applications of Hardware Boltzmann Fits;" U.S. Provisional Patent Application Ser. No. 61/550,275, filed Oct. 21, 2011 and entitled "Systems and Methods for Minimizing an Objective Function;" and U.S. Provisional Patent Application Ser. No. 61/557,783, filed Nov. 9, 2011 and entitled "Systems and Methods for Minimizing an Objective Function."

Throughout this specification and the appended claims, the term "non-quantum processor" is used to denote any form of processor or processing system that does not make direct use of quantum phenomena, such as superposition and/or entanglement, in the computation process. Examples of non-quantum processor include classical digital microprocessors (e.g., Intel Pentium® processors such as Intel i7 quad Core® processors, Intel Atom® processors, ARM Cortex® CPUs), field programmable gate arrays (FPGAs), Application Specific Integrated Circuits (ASICs) or graphical processor units (GPUs, e.g., Nvidia GPUs), and classical analog processors.

Figure 4:
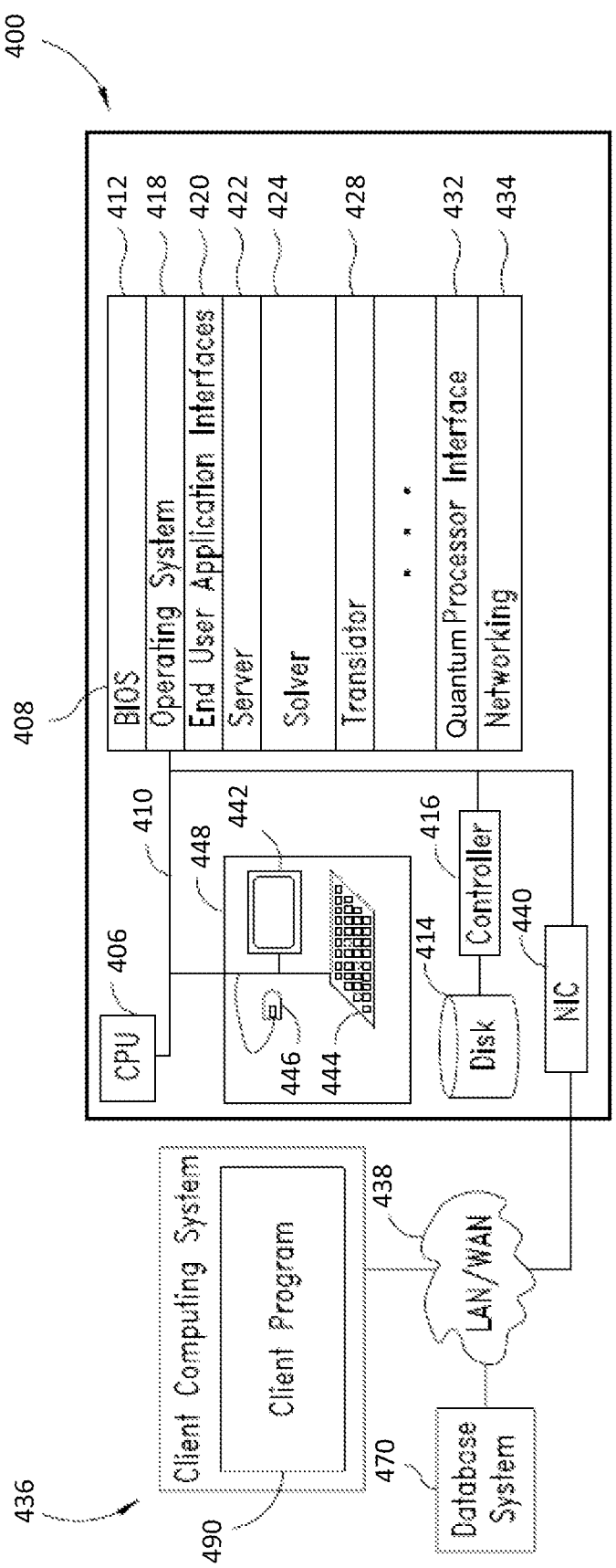
FIG. 4 is a schematic diagram of an exemplary digital computing system including a digital processor that may be used to perform digital processing tasks described in the present methods.

FIG. 4 illustrates an exemplary digital computing system 400 including a digital processor 406 that may be used to perform digital processing tasks described in the present methods. Those skilled in the relevant art will appreciate that the present methods can be practiced with other digital computing system configurations, including hand-held devices, multiprocessor systems, microprocessor-based or programmable consumer electronics, personal computers ("PCs"), network PCs, mini-computers, mainframe computers, and the like. The present methods can also be practiced in distributed computing environments, where tasks or modules are performed by remote processing devices, which are linked through a communications network. In a distributed computing environment, program modules may be located in both local and remote memory storage devices.

Digital computing system 400 may include at least one processing unit 406 (i.e., digital processor), at least one system memory 408, and at least one system bus 410 that couples various system components, including system memory 408 to digital processor 406. Digital computing system 400 will at times be referred to in the singular herein, but this is not intended to limit the application to a single digital computing system 400. For example, there may be more than one digital computing system 400 or other classical computing device involved throughout the present methods Digital processor 406 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 4 are of conventional design. As a result, such blocks need not be described in further detail herein, as they will be understood by those skilled in the relevant art.

System bus 410 can employ any known bus structures or architectures, including a memory bus with a memory controller, a peripheral bus, and a local bus. System memory 408 may include read-only memory ("ROM") and random access memory ("RAM") (not shown). A basic input/output system ("BIOS") 412, which can form part of the ROM, contains basic routines that help transfer information between elements within digital computing system 400, such as during startup.

Digital computing system 400 may also include non-volatile memory 414. Non-volatile memory 414 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 414 may communicate with digital processor 406 via system bus 410 and may include appropriate interfaces or controllers 416 coupled between non-volatile memory 414 and system bus 410. Non-volatile memory 414 may serve as long-term storage for computer-readable instructions, data structures, program modules and other data for digital computing system 400. Although digital computing system 400 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, RAMs, ROMs, smart cards, etc.

Various program modules, application programs and/or data can be stored in system memory 408. For example, system memory 408 may store an operating system 418, end user application interfaces 420, server applications 422, at least one solver module 424, and a translator module 428. In addition, system memory 408 may store at least one quantum processor interface module 432. The operation and function of these modules are discussed in detail below.

System memory 408 may also include one or more networking applications 434, for example, a Web server application and/or Web client or browser application for permitting digital computing system 400 to exchange data with sources via the Internet, corporate Intranets, or other networks, as well as with other server applications executing on server computers. Networking application 434 in the depicted embodiment may be markup language based, such as hypertext markup language ("HTML"), extensible hypertext markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 4 as being stored in system memory 408, operating system 418 and various applications/modules 420, 422, 424, 428, 432, 434 and other data can also be stored in nonvolatile memory 414.

Digital computing system 400 can operate in a networking environment using logical connections to at least one client computing system 436 and at least one database system 470. These logical connections may be formed using any means of digital communication, for example, through a network 438, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computing system 400 may be connected to the LAN through an adapter or network interface card ("NIC") 440 (communicatively linked to system bus 410). When used in a WAN networking environment, digital computing system 400 may include an interface and modem (not shown), or a device such as NIC 440, for establishing communications over the WAN. Non-networked communications may additionally, or alternatively be employed.

In a networked environment, program modules, application programs, data, or portions thereof can be stored outside of digital computing system 400. Those skilled in the relevant art will recognize that the logical connections shown in FIG. 4 are only some examples of establishing communications between computers, and other connections may also be used.

While digital computing system 400 may generally operate automatically, an end user application interface 420 may also be provided such that an operator can interact with digital computing system 400 through different user interfaces 448, including output devices, such as a monitor 442, and input devices, such as a keyboard 444 and a pointing device (e.g., mouse 446). Monitor 442 may be coupled to system bus 410 via a video interface, such as a video adapter (not shown). Digital computing system 400 can also include other output devices, such as speakers, printers, etc. Other input devices can also be used, including a microphone, joystick, scanner, etc. These input devices may be coupled to digital processor 406 via a serial port interface that couples to system bus 410, a parallel port, a game port, a wireless interface, a universal serial bus ("USB") interface, or via other interfaces.

NIC 440 may include appropriate hardware and/or software for interfacing with qubits (e.g., qubits 101 and 102 from FIG. 1) and coupling devices (e.g., coupler 111 from FIG. 1) in a quantum processor (e.g., quantum processor 100). In other embodiments, different hardware may be used to facilitate communications between digital computing system 400 and a quantum processor.

Quantum processor interface module 432 of digital computing system 400 may include run-time instructions for coordinating the solution of computationally complex problems using a quantum processor (e.g., quantum processor 100). For instance, quantum processor interface module 432 may cause a quantum processor to begin solving a QUBO problem that is representative of, or equivalent to, part of a sparse least squares problem received by server application 422. This may include, e.g., setting initial coupling values and local bias values for couplers (e.g., 111) and qubits (e.g., 101, 102), respectively.

Client computing system 436 may comprise any of a variety of computing devices communicatively coupled to digital computing system 400, and may include a client program 490 configured to properly format and send problems directly or indirectly to server application 422. Once digital computing system 400 has determined a solution, server application 422 may be configured to send information indicative of this solution back to client program 490.

Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative paths available to three other qubits, although in any particular application less than all of those communicative paths may be employed. In a quantum processor employing coupling devices between qubits, this would mean a qubit having a connectivity of three is communicably coupleable via three coupling devices. Traditionally, the number of qubits in a quantum processor limits the size of problems that may be solved and the connectivity between the qubits in a quantum processor limits the complexity of the problems that may be solved.

The various embodiments of employing the techniques of compressed sensing in using a quantum processor to solve computational problems may be applied in a wide range of applications. For example, the minimization of equation 2 (being representative of equation 1) may be used to generate features in any learning problem, such as machine learning applications including pattern recognition, image recognition, applications of artificial intelligence, software verification and validation, and the training of an artificial neural network. Furthermore, compressed sensing techniques may be used in applications directed towards data compression, such as image compression, audio compression, data file compression, and video compression. Thus, the various embodiments described herein provide methods for employing a quantum processor in data compression.

For example, in an application of video compression, the $y_i$ data set (introduced in equation 1 and used throughout this specification) may represent a set of frames (e.g., pixel values, RGB values, etc.) from a video sequence. In other words, $y_i$ may include the pixel values for a first frame of a video sequence, $y_2$ may include the pixel values for a second frame of the video sequence, etc., up to $y_n$, where the video sequence includes n frames. Once the corresponding dictionary elements are learned (e.g., via a quantum processor as described herein), the dictionary itself may be transmitted and transmission of the complete (and typically large) video data may be reduced to transmission of simple bits indicating which basis elements are to be active for each frame.

Throughout this specification and the appended claims, the terms "optimize" and "minimize" are often used. These terms are used herein in a loose sense to denote a procedure where an optimal value (e.g., a minimal value) is sought, but are not intended to restrict the present methods to embodiments where only optimal (e.g., minimal) values are obtained. A person of skill in the art will appreciate that "optimizing" an objective is a process of attempting to determine an optimal value and may produce a sufficient and/or satisfactory value that is sub-optimal. Thus, the term "optimizing" where used in this specification and the appended claims should be construed as "seeking an at least approximately optimal value" and similarly "minimizing" should be construed as "seeking an at least approximately minimum value."

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of minimizing an objective including a set of weights and a dictionary, the method comprising:

casting the set of weights in the objective as Boolean variables via a digital processor;

setting a first set of values for the dictionary via the digital processor;

optimizing the objective for a first set of values for the Boolean weights based on the first set of values for the dictionary by: mapping the objective to a first quadratic unconstrained binary optimization ("QUBO") problem and by at least approximately minimizing the first QUBO problem via at least one of adiabatic quantum computation or quantum annealing performed by a quantum processor;

optimizing the objective for a second set of values for the dictionary based on the first set of values for the Boolean weights by updating at least some of the values for the dictionary via a non-quantum processor;

optimizing the objective for a second set of values for the Boolean weights based on the second set of values for the dictionary by mapping the objective to a second QUBO problem and by at least approximately minimizing the second QUBO problem via the quantum processor; and optimizing the objective for a third set of values for the dictionary based on the second set of values for the Boolean weights by updating at least some of the values for the dictionary via the non-quantum processor.

2. The method of claim 1, further comprising:

optimizing the objective for a $t^{th}$ set of values for the Boolean weights, where t is an integer greater than 2, based on the third set of values for the dictionary, by mapping the objective to a $t^{th}$ QUBO problem and by at least approximately minimizing the $t^{th}$ QUBO problem via the quantum processor;

optimizing the objective for a $(t+1)^{th}$ set of values for the dictionary based on the $t^{th}$ set of values for the Boolean weights by updating at least some of the values for the dictionary via the non-quantum processor; and optimizing the objective for a $(t+1)^{th}$ set of values for the Boolean weights based on the $(t+1)^{th}$ set of values for the dictionary by mapping the objective to a $(t+1)^{th}$ QUBO problem and by at least approximately minimizing the $(t+1)^{th}$ QUBO problem via the quantum processor.

3. The method of claim 2 wherein the optimizing the objective for a $(t+1)^{th}$ set of values for the dictionary based on the $t^{th}$ set of values for the Boolean weights and the optimizing the objective for a $(t+1)^{th}$ set of values for the Boolean weights based on the $(t+1)^{th}$ set of values for the dictionary are repeated for incremental values of t until at least one solution criterion is met.

4. The method of claim 3 wherein the at least one solution criterion includes either convergence of the set of values for the Boolean weights or convergence of the set of values for the dictionary.

5. The method of claim 1 wherein minimizing an objective comprises generating features in a learning problem.

6. The method of claim 5 wherein the learning problem is selected from the group consisting of: pattern recognition, training an artificial neural network, and software verification and validation.

7. The method of claim 5 wherein the learning problem corresponds to either a machine learning problem or an application of artificial intelligence.

8. The method of claim 1 wherein the set of values for the dictionary includes a set of columns, and wherein updating at least some of the values for the dictionary includes updating at least some of the columns of the dictionary.

9. The method of claim 1 wherein minimizing an objective includes solving a sparse least squares problem.

10. The method of claim 1 wherein minimizing an objective includes performing data compression.

11. A method of minimizing an objective including a set of weights and a dictionary, the method comprising:
casting the set of weights in the objective as Boolean variables via a digital processor;
setting a first set of values for the Boolean weights via the digital processor;
optimizing the objective for a first set of values for the dictionary based on the first set of values for the Boolean weights by updating at least some of the values for the dictionary via a non-quantum processor;
optimizing the objective for a second set of values for the Boolean weights based on the first set of values for the dictionary by mapping the objective to a first quadratic unconstrained binary optimization ("QUBO") problem and by at least approximately minimizing the first QUBO problem via at least one of adiabatic quantum computation or quantum annealing performed by quantum processor;
optimizing the objective for a second set of values for the dictionary based on the second set of values for the Boolean weights by updating at least some of the values for the dictionary via the non-quantum processor; and
optimizing the objective for a third set of values for the Boolean weights based on the second set of values for the dictionary by mapping the objective to a second quadratic unconstrained binary optimization ("QUBO") problem and by at least approximately minimizing the second QUBO problem via the quantum processor.

12. The method of claim 11, further comprising:
optimizing the objective for a $t^{th}$ set of values for the dictionary, where t is an integer greater than 2, based on the third set of values for the Boolean weights, by updating at least some of the values for the dictionary via the non-quantum processor;
optimizing the objective for a $(t+1)^{th}$ set of values for the Boolean weights based on the $t^{th}$ set of values for the dictionary by mapping the objective to a $t^{th}$ quadratic unconstrained binary optimization ("QUBO") problem and by least approximately minimizing the $t^{th}$ QUBO problem via a quantum processor; and
optimizing the objective for a $(t+1)^{th}$ set of values for the dictionary based on the $(t+1)^{th}$ set of values for the Boolean weights by update-updating at least some of the values for the dictionary via the non-quantum processor.

13. The method of claim 12 wherein the optimizing the objective for a $(t+1)^{th}$ set of values for the Boolean weights based on the $t^{th}$ set of values for the dictionary and the optimizing the objective for a $(t+1)^{th}$ set of values for the dictionary based on the $(t+1)^{th}$ set of values for the Boolean weights are repeated for incremental values of t until at least one solution criterion is met.

14. The method of claim 13 wherein the at least one solution criterion includes either convergence of the set of values for the Boolean weights or convergence of the set of values for the dictionary, and further comprising determining whether convergence has occurred.

15. The method of claim 11 wherein minimizing an objective comprises generating features in a learning problem.

16. The method of claim 15 wherein the learning problem is selected from the group consisting of: pattern recognition, training an artificial neural network, and software verification and validation.

17. The method of claim 15 wherein the learning problem corresponds to either a machine learning problem or an application of artificial intelligence.

18. The method of claim 11 wherein the set of values for the dictionary includes a set of columns, and wherein updating at least some of the values for the dictionary includes updating at least some of the columns of the dictionary.

19. The method of claim 11 wherein minimizing an objective includes solving a sparse least squares problem.

20. The method of claim 11 wherein minimizing an objective includes performing data compression.

* * * * *

UNITED STATES PATENT AND TRADEMARK OFFICE
CERTIFICATE OF CORRECTION

| | | |
|---|---|---|
| PATENT NO. | : 8,977,576 B2 | Page 1 of 1 |
| APPLICATION NO. | : 13/300169 | |
| DATED | : March 10, 2015 | |
| INVENTOR(S) | : William G. Macready | |

It is certified that error appears in the above-identified patent and that said Letters Patent is hereby corrected as shown below:

IN THE CLAIMS

Column 26, Line 6:
"weights by updating-updating at least some of the" should read as, --weights by updating at least some of the--.

Signed and Sealed this
First Day of March, 2016

Michelle K. Lee
*Director of the United States Patent and Trademark Office*